US 6,665,703 B1

(12) United States Patent
Shatil et al.

(10) Patent No.: US 6,665,703 B1
(45) Date of Patent: Dec. 16, 2003

(54) STORAGE SYSTEM WITH INTERNAL LAN

(75) Inventors: Arod Shatil, Brookline, MA (US); Haim Avni, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/517,063

(22) Filed: Feb. 9, 2000

Related U.S. Application Data

(63) Continuation of application No. 09/002,418, filed on Jan. 2, 1998.

(51) Int. Cl.[7] .............................................. G06F 15/16
(52) U.S. Cl. ....................... 709/200; 455/4.2; 710/129
(58) Field of Search .................... 709/213, 202, 709/200, 224, 249, 221, 203; 379/88; 370/213, 398, 401, 360, 398.17, 466, 353; 710/129; 711/102, 162; 714/4; 455/4.2

(56) References Cited

U.S. PATENT DOCUMENTS

| 5,291,489 | A | * | 3/1994 | Morgan et al. | 370/401 |
|---|---|---|---|---|---|
| 5,485,579 | A | * | 1/1996 | Hitz et al. | 709/221 |
| 5,568,471 | A | * | 10/1996 | Hershey et al. | 370/17 |
| 5,682,509 | A | * | 10/1997 | Kabenjian | 710/312 |
| 5,822,782 | A | * | 10/1998 | Humlicek et al. | 711/170 |
| 5,829,012 | A | * | 10/1998 | Marlan et al. | 711/102 |
| 5,850,395 | A | * | 12/1998 | Hauser et al. | 370/398 |
| 5,937,174 | A | * | 8/1999 | Weber | 710/129 |
| 5,970,066 | A | * | 10/1999 | Lowry et al. | 370/353 |
| 5,975,738 | A | * | 11/1999 | DeKoning et al. | 700/79 |
| 6,012,099 | A | * | 1/2000 | Chung | 709/249 |
| 6,085,243 | A | * | 7/2000 | Fletcher et al. | 709/224 |
| 6,112,241 | A | * | 8/2000 | Abdelnour et al. | 709/224 |
| 6,128,467 | A | * | 10/2000 | Rege | 455/4.2 |
| 6,205,137 | B1 | * | 3/2001 | Ariga | 370/360 |
| 6,219,693 | B1 | * | 4/2001 | Napolitano et al. | 709/203 |
| 6,243,394 | B1 | * | 6/2001 | Deng | 370/466 |
| 6,298,386 | B1 | * | 10/2001 | Vahalia et al. | 709/234 |
| 6,314,525 | B1 | * | 11/2001 | Mahalingham et al. | 714/4 |
| 6,487,644 | B1 | * | 11/2002 | Huebsch et al. | 711/162 |

OTHER PUBLICATIONS

Wood, Client/Server Data Serving for High–Performance Computing. www.computer.org/conferences/mss95/wood/wood.html.*

* cited by examiner

Primary Examiner—Mark R. Powell
Assistant Examiner—Thong Vu
(74) Attorney, Agent, or Firm—John M. Gunther; Leanne J. Fitzgerald; Robert Kevin Perkins

(57) ABSTRACT

A storage system is provided which includes an internal local area network. The local area network is achieved by providing a separate Ethernet bus as well as Ethernet hardware on each host and disk/tape controller within the storage system. Each host controller and disk/tape controller is coupled to the Ethernet bus via the Ethernet interface hardware. Also coupled to the Ethernet bus is a service processor. The service processor is coupled to the Ethernet bus via an Ethernet hub. All communications between the service processor and the controllers occurs over the Ethernet bus. This allows communications with the controllers which does not materially impact the operation of the storage system in providing storage services to the attached host computers.

2 Claims, 3 Drawing Sheets

STORAGE SYSTEM WITH INTERNAL LAN

This is a continuation of U.S. patent application Ser. No. 09/002,418, filed Jan. 2, 1998 and claims the benefit of priority under 35 USC 120.

BACKGROUND OF THE INVENTION

This invention relates generally to data processing systems and more particularly to a method and apparatus for providing communications among a plurality of controllers within a storage system to allow efficient management of the storage system.

As it is known in the art, data processing systems generally include several types of processing resources which may be interconnected by one or more communication links. In addition to the processor resources, data processing systems also generally include some sort of memory which is typically shared amongst the processor resources. As is common in many computer systems these processing resources may act independently to perform different processing tasks. Since each of the processing resources may act independently there may arise a situation where there is contention for the shared memory resources within the system.

One example of a data processing system which includes several processing resources coupled to a common memory over one or more busses or data storage systems such as the Symmetrix family of data storage systems manufactured by EMC Corporation. These storage systems are typically capable of being coupled to several different host computers at any given time and provide storage services to each of those computers independently. In order to support transactions between a plurality of host computers simultaneously the storage system includes several host controllers for managing the communication between the host computer and the storage system. In addition, the Symmetrix storage systems mentioned above include several disk/tape controllers which are each responsible for managing one or more arrays of disk/tape type storage devices. Each of the controllers in the above described storage system may be a single or multi-processor computer.

In addition to the host controllers and disk/tape controllers mentioned above the storage subsystem may also contain a very large shared memory which is used to manage the transfer of data from the host computers to the storage devices as well a to manage the transfer of data from the storage devices to the host computer.

In the storage systems described above, a separate service processor may be provided in order to provide monitoring and maintenance functions across all elements of the system. In order to provide these maintenance and monitoring functions, it is necessary for the service processor to have a communications link between it and all controllers on the system. Prior art storage systems typically may have utilized the same buses for communications that are used to provide storage system services. It is apparent that any communication between the service processor and the controllers using the scheme would be done at the expense of storage system performance.

Other methods of providing communication between the controllers and the service processor may have included the use of a dedicated serial bus. The serial communications paths of the prior art suffer from several drawbacks. One drawback is that the communications are not secure (or robust). For example, if during communications, a byte of data is lost, there is an indication that the byte is lost. However, the indication must be checked for manually (i.e. by the operating software through a specific call added by the programmer). This may result in undetected errors in communication. Secondly serial communications are relatively slow. Lastly, serial communications with the individual controllers causes a severe performance impact on the target controller. That is, when the service processor is communicating with a storage controller, the performance of that controller in servicing storage requests is severely impacted. This impact may then cause degraded performance of the attached host computer, especially for such applications that require the seamless delivery of video data from the storage system.

It would be advantageous therefore to provide a data storage system having an efficient communications means for monitoring and maintaining the associated storage system controllers.

SUMMARY OF THE INVENTION

In accordance with the present invention, a storage system is provided which includes an internal local area network. The local area network is achieved by providing a separate Ethernet communications link, including an Etherne hub as well as Ethernet hardware on each host and disk/tape controller within the storage system. Each host controller and disk/tape controller is coupled to the Ethernet hub via the Ethernet interface hardware. Also coupled to the Ethernet bus is a service processor. The service processor is alos coupled to the Ethernet bus via the Ethernet hub. All communications between the service processor and the controllers occurs over the Ethernet bus. With such an arrangement, communications with the storage system controllers may take place without material impact on the operation of the storage system in providing storage services to the attached host computers.

BRIEF DESCRIPTION OF THE DRAWINGS

The above and further advantages of the present invention may be better understood by referring to the following description taken into conjunction with the accompanying drawings in which.

DETAILED DESCRIPTION OF THE PREFERRED EMBODIMENT

Figure 1:
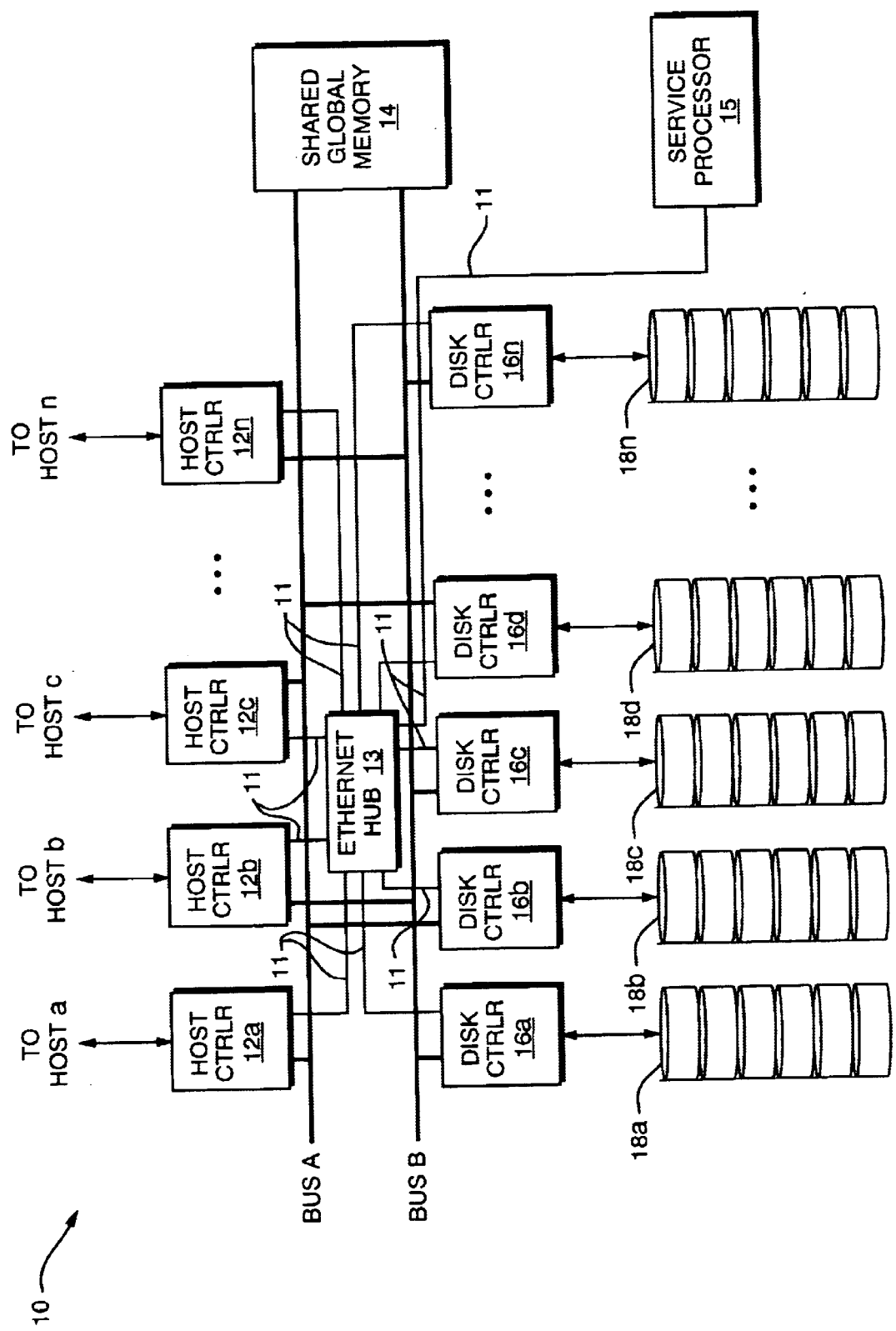
FIG. 1 is a block diagram of a preferred embodiment of a storage system incorporating the present invention.

Referring first to FIG. 1, a storage system 10 is shown to include a plurality of host controllers 12a–12n which are, according to a preferred embodiment of the present invention, coupled alternately to buses A and B. Each host controller 12a–12n is responsible for managing the communication between its associated attached host computers and storage system 10. The host controllers of the preferred embodiment may include one or more central processing units (CPUs). The controller CPUs operate under program control to manage the flow of data between an associated host computer and the storage system 10.

Also coupled alternately to buses A and B are a plurality of disk/tape/tape controllers 16a–16n. Controllers 16a–16n are here similar in construction to controllers 12a–12n. That is, each includes at least one CPU configured to operate under control of a program loaded into an associate CPU program memory. Coupled to each disk/tape/tape controller 16a–16n is an array of storage devices 18a–18n which as shown here may be magnetic disk/tape/tape devices. Like the host controllers described above, each disk/tape/tape controller is responsible for managing the communications between its associated array of disk/tape/tape drives and the host controllers or memory 14 of storage system 10.

In addition to the controllers described above, storage system 10 also includes a shared memory 14 coupled to both buses A and B. According to a preferred embodiment of the present invention, a portion of shared memory 14 serves as a very large cache. The cache is used as a staging area during the transfer of data between the host computers and the storage devices of disk/tape arrays 18a–18n. In addition, the shared memory includes a number of single entry queues or device records.

Still referring to FIG. 1 and according to the present invention, storage system 10 includes an internal local area network. Here, the internal network is an Ethernet network and includes buses 11 and Ethernet hub 13. Each controller is coupled to the Ethernet hub 13 and as such conceptually, bus 11 exists inside the Ethernet hub 13 which is further coupled to the service processor 15. This configuration is known in the art as a 10BaseT type arrangement. An alternate arrangement would inlcude having each controller coupled to a common bus but without an Ethernet hub.

As will be described below, each controller includes an Ethernet interface which is used to couple bus 11 to the respective controllers. As will also be described below, communications over bus 11 conform to a modified Ethernet communications protocol. The service processor 15 is here used to communicate with the controllers 12a–n and 16a–n in order to provide maintenance and monitoring functions for storage system 10. In the preferred embodiment, the service processor is a personal computer which is equipped with an Ethernet interface card. Some of the functions performed by service processor include: software updates to the controllers, monitoring of system activity, and remote and local maintenance operations of storage system 10.

Generally, the advantage of providing an internal LAN using Ethernet includes a significant decrease in the amount of time that is required for such things as software upgrades. As a comparison, using a serial connection between the service processor 15 and the individual controllers would result in a software upgrade lasting upwards of two hours. During this time, performance of the storage system suffers. Additionally, a service technician must be present throughout the upgrade process. In comparison, with the integral local area network of the present invention, the time to perform a software upgrade for the storage system may take only several minutes.

Figure 2:
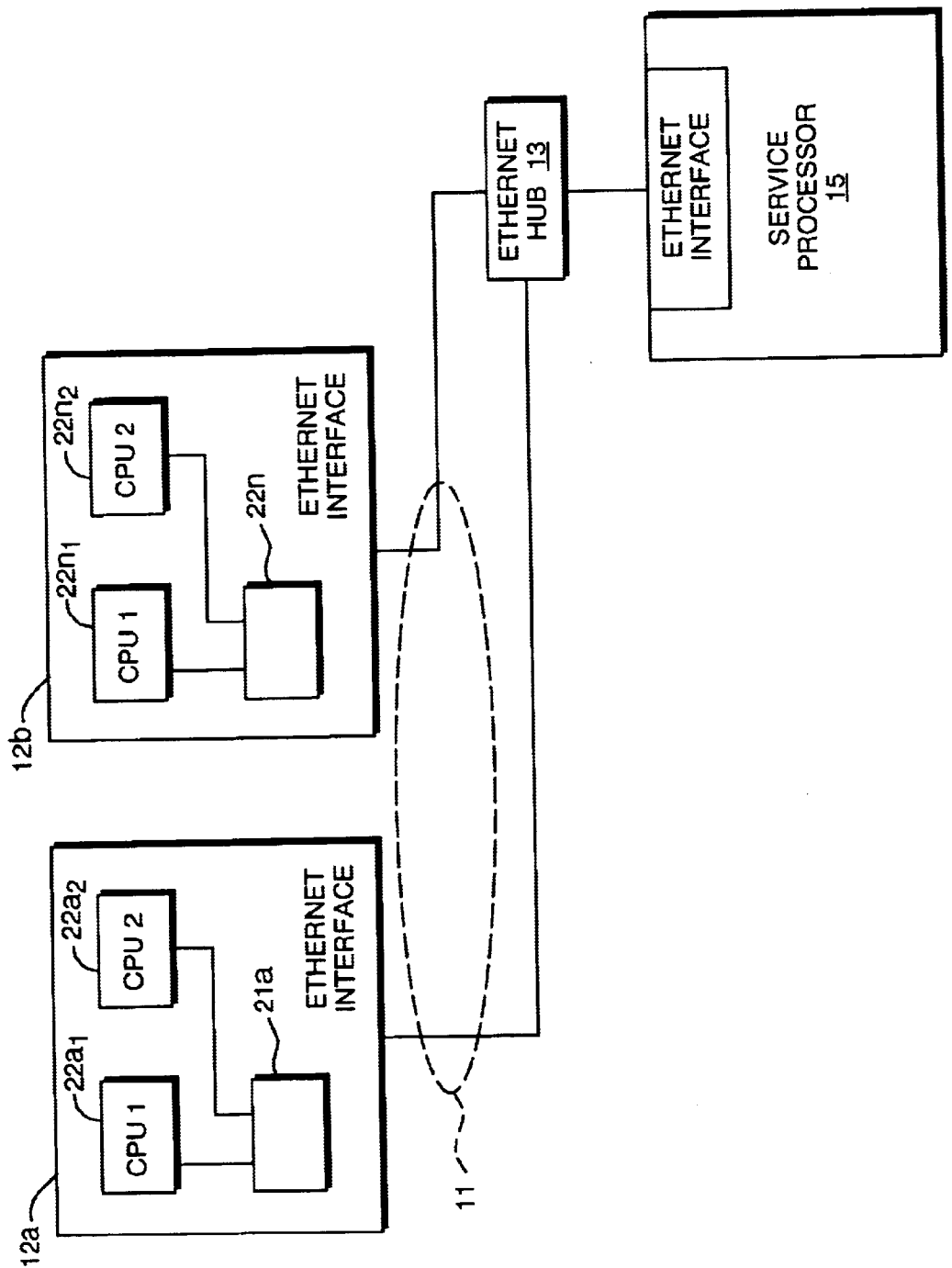
FIG. 2 is a block diagram of a portion of the storage system of FIG. 1.

Referring now to FIG. 2, a portion of the storage system 10 of FIG. 1 is shown. Here only two host controllers 12a and 12n are depicted for ease of discussion. Each controller 12a and 12n is shown to further include two central processing units $22a_1$–$22a_2$ and $22n_1$, $22n_2$ respectively. Considering only controller 12a, each of the CPUs $22a_1$ and $22a_2$ are coupled to an Ethernet interface 21a. According to the preferred embodiment, the Ethernet interface is a combination of hardware elements which facilitate the communications over bus 11 between controller 21a and the service processor 15 (via the Ethernet hub 13).

As mentioned earlier, the service processor 15 also includes an Ethernet interface 23. This interface may be any one of a number of well known Ethernet interface cards for use with personal computers. The combination of bus 11, interfaces 21a–21n, Ethernet hub 13 and Ethernet interface 23 provide a local area network within the storage system 10.

Figure 3:
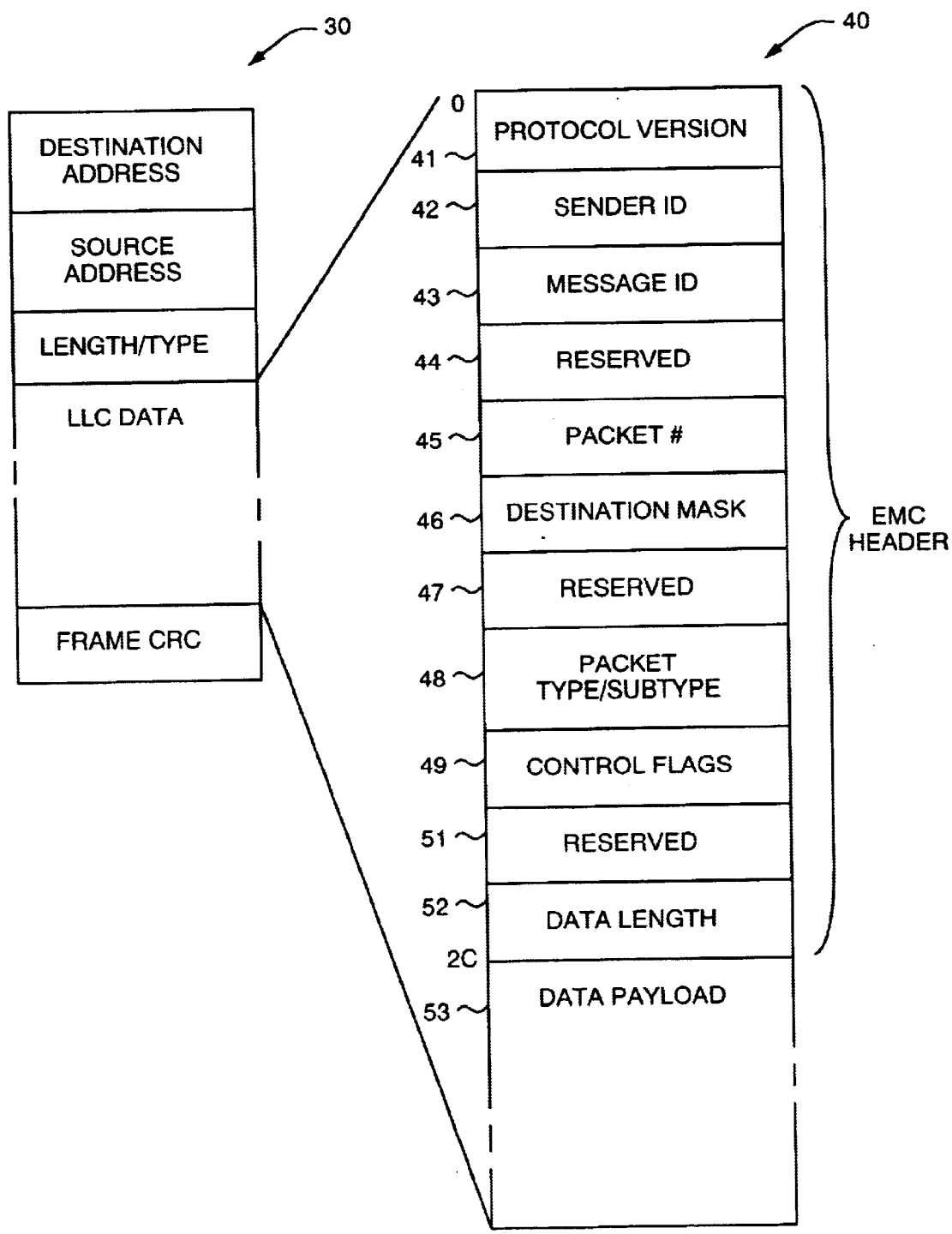
FIG. 3 is a diagram of a transmission packet used during communications over the internal local area network of the storage system of FIG. 1.

All communication between the service processor 15 and the controllers 12a–n and 16a–n occurs over the internal Ethernet channel 13. According to the preferred embodiment, information is exchanged through IEEE 802.3 Media Access Control (MAC) frames that are generated by the service processor 15 and the controllers. The Ethernet protocol described in this document is primarily asynchronous; exceptions to this are noted when necessary. Referring now to FIG. 3, a MAC frame 30 is shown to include several fields. The first two fields 32, 34 of the MAC frame hold the destination and source addresses of the frame respectively. The MAC address for the service processor is determined by its associated Ethernet interface 23 (FIG. 2). According to the preferred embodiment, the address of a given controller is 00 60 48 00 00+controller_slot#, where the slot number is a 1 byte quantity, and "00 60 48" is IEEE Organizationally Unique Identifier (OUI), here used to identify the EMC Corproation Symmetrix family of storage systems.

To designate each MAC frame as a part of this Ethernet protocol, the Length/Type field 26 contains the EMC specific Protocol Code, which is here set to E6DCh. The MAC frame's Logical Link Control (LLC) Data field contains the EMC Packet structure 40 as shown in FIG. 3.

Each of the fields in the EMC Packet is used to identify and/or facilitate the communications between the service processor 15 and each of the controllers. Field 41 identifies the so called Protocol Version. This is used to identify the version of the communication protocol and is useful in providing backward compatibility between versions. Field 42 includes the ID of the controller or service processor which is initiating the communication. Each of the controllers and the service processor are uniquely identified. For example, in the preferred embodiment, the service processor 15 is identified with the value 0100h. Field 43 is used to send a Message ID which is here a counter that is incremented for each new packet sent by the service processor. Field 45 is used to identify a packet in a sequence of packets. This information is used for chaining of packets and to identify lost packets. Field 46 is a Destination Mask. The Destination Mask is used to identify the intended recipient controller for a message sent by the service processor. By using a mask, it can be seen that packets may be broadcast or multicast to several controllers simultaneously. Field 48, as will be described in detail below, is used to identify the Packet Type and Subtype. That is, it is used to identify the type of transmission associated with the Packet. Field 49 is used to transmit Control Flags. In the preferred embodiment, when certain bits of the control flag are set, the Destination Mask may be augmented to indicate that the packet is intended for the service processor 15 or that the service processor should ignore the packet. Additionally, with other bits are set, an indication is given to the receiving controller that receipt of the packet must be acknowledged or alternately that no acknowledgment is necessary. Field 52 of the EMC Packet 40 is used to indicate that number of bytes of data being transmitted in the Data field. The Data field of Packet 40 is the payload of the packet. That is, it is the actual data being transmitted during the particular transaction.

In accordance with the present invention, there are several different types of packets that allow the service processor and controllers to communicate. The packet types include Service, Command, Response, and Async. Each of the command types also includes a subtype. The commands and the associated subtypes are identified in Table 1 below.

TABLE 1

| Type | Hex value for high order bits | Subtype | Hex value for low order bits |
|---|---|---|---|
| Service | 0000 | Query Status ("ping") | 0000 |
|  |  | Return Status ("ack") | 0001 |
| Command | 000C | Binary Inline | 0001 |
|  |  | Syscall | 0002 |
|  |  | ASCII Inline | 0004 |
|  |  | Request last Status | 0005 |
| Response | 0003 | Binary Response | 0001 |
|  |  | ASCII Response | 0002 |
|  |  | Utility start | 0004 |
|  |  | Utility end | 0005 |
| Async | 000A | IML | 0001 |
|  |  | Power-up | 0002 |
|  |  | IML failure | 0006 |
|  |  | Error | 000E |
|  |  | Inline Queue Tag | 000F |

In order to identify the type of communication, the packet type and sub type is placed in field 48 of the EMC Packet structure 40. For example, a packet for an ASCII inline command would have a value of 000C0004h.

Of the Service type Packets listed in Table 1, the first is the Query or Ping operation. There are two type of ping operations. The first is a global ping in which the service processor 15 broadcasts the Query Status command to all controllers in the storage system. The Packet for a Query Status command has no payload. Thus, the Packet includes only the header fields (41–52) with the Data Length filed 52 set to the value zero.

In response to receipt of the ping, each active controller in the system sends back an acknowledgment to the service processor. Receipt of the acknowledgment allows the service processor to build an address table for each controller in the system. Additionally, each controller in the system builds a local configuration table from the packets seen as they are transmitted by the responding controllers over bus 11. As described above, each controller responds to a Ping operation. The response is accomplished by transmitting a Service packet having a subtype of Return Status or ("Ack"). The data portion (Data Payload) of a Packet during an Ack transmission is empty. So, the only thing transmitted is the header portion (fields 41–52) with the data length field 52 having a value of zero.

The command type packets used over during a transmission over the Ethernet bus fall into four categories as shown in table 1. The first is the binary in-line command which is used to send specific storage system commands to controllers in the storage system using a binary data format. In the preferred embodiment the command is passed in hexadecimal format with any empty parameter fields padded with zeros. If there is data that needs to be passed with the command it is included in the data field of the command packet. The receiving director recognizes that there is associated data with the binary in-line command by examining the data link field of the header portion of the EMC packet 40. The format of the data sent during a binary in-line command is illustrated in table 2 below.

TABLE 2

| Hex Byte | Description |
|---|---|
| 2C–2D | Flags: |
|  | bit 0: Command is sent with parameters |
|  | bit 1: Broadcast command (must be used in conjunction with bit 9) |
|  | bit 3: Command is in ASCII mode |
|  | bit 9: Send command using the inline queue[a] |
|  | bit 10: Interpret dir_mask as dir_type (for example, EA, DA) |
| 2E | RESERVED |
| 2F | Responding controller D (0–1Fh); only the specified controller should send the necessary response |
| 30–33 | Controller mask |
| 34–35 | Command source (directors: 0–1Fh; source: 100h)[b] |
| 36–37 | Inline utility tag |
| 38–3B | Utility |
| 3C–3F | Utility parameter 1 |
| ... | ... |
| 7C–7F | Utility parameter 13 |
| 80–n | Appended data; currently only used for utility 8C. |

It should be noted that the entire contents of table 2 would be sent as part of field 53 of the EMC packet 40. As shown in table 2 at addresses 2C to 2D, certain flags are transmitted to identify the type of command. At byte 2F, a identifier of the control which should respond to the command is sent. At bytes 30 through 33, a controller mask is included which identifies the controllers which should receive the binary in-line command. Other data is sent in other bytes of the payload which includes specific information useful to the receiving controllers.

Another sub-type for the command packet-type is an ASCII in-line command. The ASCII in-line command packet is constructed similarly to the binary in-line packet and is shown in table 3 below.

TABLE 3

| Hex Byte | Description |
|---|---|
| 2C–2D | Flags: |
|  | bit 0: Command is sent with parameters |
|  | bit 1: Broadcast command (must be used in conjunction with bit 9) |
|  | bit 3: Command is in ASCII mode |
|  | bit 9: Send command using the inline queue[a] |
|  | bit 10: Interpret dir_mask as dir_type (for example, EA, DA) |
| 2E | RESERVED |
| 2F | Responding controller ID (0–1Fh); only the specified controller should send the necessary response |
| 30–33 | Controller mask |
| 34–35 | Command source (directors: 0–1Fh; source: 100h)[b] |
| 36–37 | Tag |
| 38–39 | String length |
| 3C–3F | Utility parameter 1 |
| 3A–138 | ASCII string (255 bytes) |
| 139–n | Appended data (if any) |

As with the binary in-line packet, the ASCII in-line packet is sent as the data payload portion of an EMC packet 40. Bytes 2C through 2D of the ASCII in-line payload includes flags which identify the particular mode of the transmission. Byte 2F includes an identification of a controller which should respond to the ASCII in-line command. Bytes 30 through 33 included a controller mask which indicates those which are the target of this ASCII in-line command. Bytes 34 and 35 indicate the source or the sender of the command, that is it identifies the controller or the service processor which are sent to the ASCII in-line command. Other data is also provided with the ASCII in-line payload. That data is specific to the operation of the controllers.

Other command types supported by the Ethernet communications protocol of the present invention include the response command and the associated sub-types as well as the ASCII command and the associated sub-types. Each of these commands are built similarly to the commands described above and are used to perform storage specific operations. The important point to note is that each of these commands are built and transmitted using the EMC packet 40 with the specifics of the individual commands sent in the data payload field 53 of packet 40. It can be seen then that by providing an internal local network to the storage system that has a specific communications protocol, a powerful yet fast communications medium between a service processor and any individual controllers that make up a storage system.

Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the appended claims.

What is claimed is:

1. A single disk array data storage system that comprises within the single system:

a first bus;

a plurality of controllers, each controller including a network interface device for communicating in accordance with a local area network protocol and each controller being coupled to said first bus;

a plurality of disk storage devices in communication with said plurality of controllers and forming a disk array within said single disk array data storage system;

a memory device and a processor coupled to said first bus;

a second bus coupled to each of said plurality of controllers via said network interface, and wherein said second bus includes a hub device that operates in accordance with a local area network protocol; and a service processor coupled to said second bus and operable to communicate with said plurality of controllers over said second bus in accordance with a local area network protocol such that service processor, interface device, and hub device operate within the storage system as local area network and wherein the local area network is located within the single disk array data storage system and is part of the single disk array data storage system.

2. The single disk array data storage system of claim 1, wherein the service processor is operable to communicate with said plurality of controllers over said second bus without interfering with two indications between said controllers and said memory over said first bus, and wherein said interface device is in an Ethernet bus interface device and wherein said second bus is an Ethernet bus and includes an Ethernet hub device and wherein each is a controller and said service processor is coupled to said Ethernet hub.

* * * * *